United States Patent [19]
Lowe et al.

[11] 3,732,911
[45] May 15, 1973

[54] PROCESS FOR RECONDITIONING SPENT OLIVE-PROCESSING BRINES

[75] Inventors: Edison Lowe, El Cerrito; Everett L. Durkee, El Sobrante, both of Calif.

[73] Assignee: The United States of America as represented by the Secretary of Agriculture, Washington, D.C.

[22] Filed: Mar. 16, 1971

[21] Appl. No.: 124,895

[52] U.S. Cl....159/47 WL, 159/16 A;DIG. 10, 9/156
[51] Int. Cl. .........B01d 1/14, B01d 1/02, B01d 1/00, A23b 7/00, C10b 47/00
[58] Field of Search.......................159/16 A, 47 WL, 159/17 VS, 4 A; 203/100, 49; 23/275, 307; 99/156, 159; 202/234

[56] References Cited

UNITED STATES PATENTS

| 2,196,496 | 4/1940 | Hamm | 23/262 |
| 2,582,371 | 1/1952 | Ball et al. | 99/156 |
| 2,614,651 | 10/1952 | Wintermute | 159/47 WL UX |
| 2,614,652 | 10/1952 | Sultzer | 23/272 X |
| 3,446,712 | 5/1969 | Othmer | 159/16 A X |
| 2,056,266 | 10/1936 | Goodell | 23/48 |
| 2,839,122 | 6/1958 | Laguiharre | 159/4 A |

FOREIGN PATENTS OR APPLICATIONS

| 1,092,441 | 11/1960 | Germany | 203/25 |

Primary Examiner—Norman Yudkoff
Assistant Examiner—J. Sofer
Attorney—R. Hoffman, W. Bier and W. Takacs

[57] ABSTRACT

Spent brines—for example, those derived from olive processing plants—are reconditioned by applying a series of steps: Concentration of the brine using submerged combustion, incineration of the concentrate, dissolution of the residue in water, and filtration of the resulting solution.

2 Claims, 1 Drawing Figure

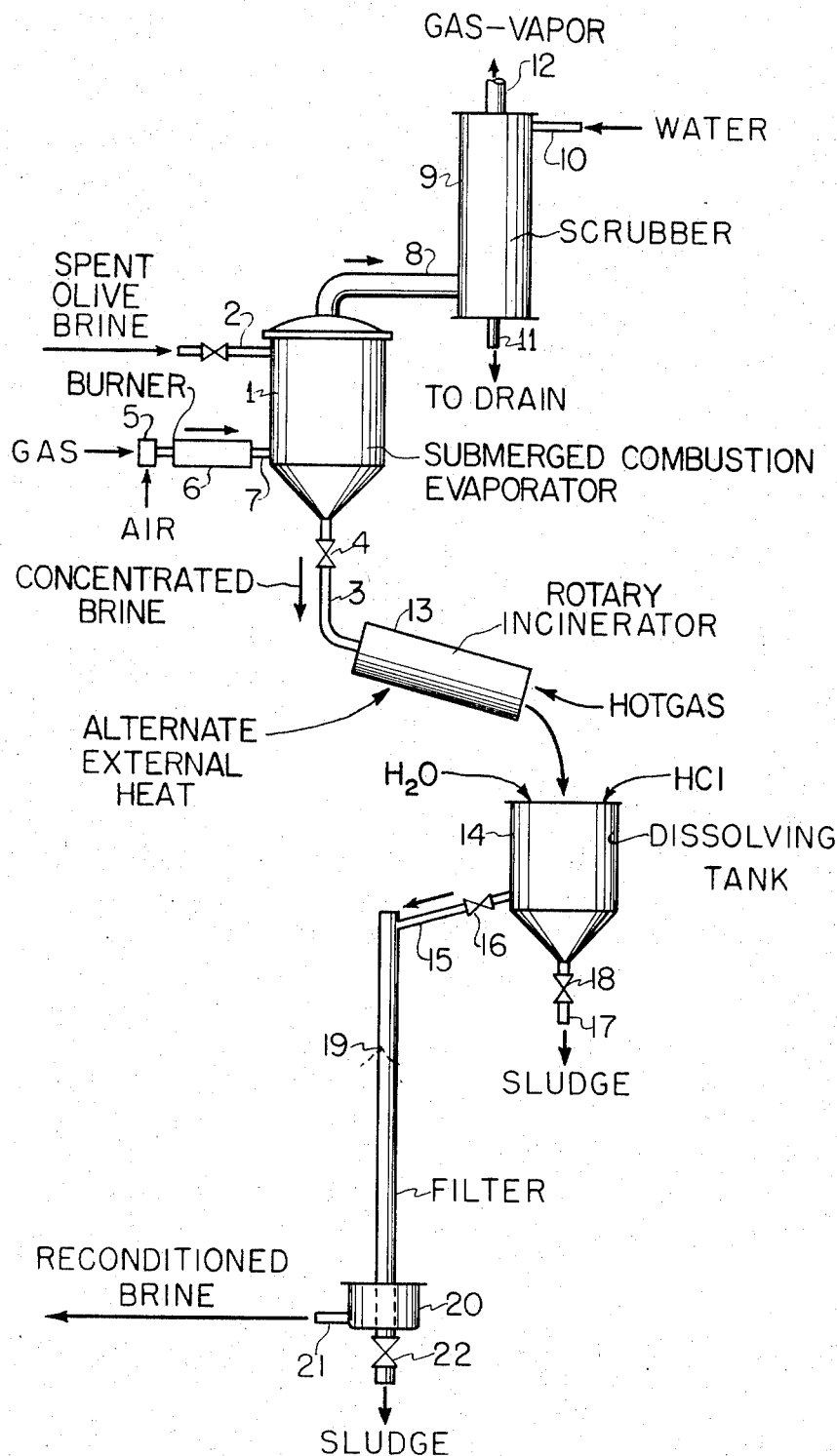

3,732,911

PROCESS FOR RECONDITIONING SPENT OLIVE-PROCESSING BRINES

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its objects the provision of a novel process for reconditioning spent brines so that they can be recycled. Further objects of the invention will be evident from the following description wherein parts and percentages are by weight unless otherwise specified.

The single FIGURE in the annexed drawing is a flow sheet of the process of the invention with equipment depicted diagrammatically.

In the following description emphasis is directed to the treatment of used olive-processing brine. It should be understood that this particular embodiment of the invention is provided by way of illustration and not limitation. In its broad ambit the invention is applicable to spent brines of all kinds, for example, those which are derived from the processing of cucumbers, peppers, tomatoes, onions, meats, fish, and other food products.

In preparing olives for the market in such form as canned ripe olives, for example, it is conventional practice to ferment the freshly harvested fruit as a preliminary step. This is done by holding the olives in brine, that is, a solution of ordinary salt (NaCl) in water. The concentration of the brine depends on the variety of olive under treatment, and usually ranges from 3 to 5 percent initially. The concentration is gradually increased over a period of 3 to 4 weeks to a level of 7 to 9 percent, again depending on variety. In most cases, the olives are held in the brine for a period of 1 to 6 months. At the end of this treatment, the olives are removed for further processing, leaving the spent brine as a waste material. In addition to salt (about 7–9 percent), this material contains organic substances such as lactic and other acids, proteinous materials, pigments, etc.

The olive industry in California annually generates about 7–8.5 million gallons of used processing brine. The disposal of this amount of saline liquid waste has become a series problem to the industry. The corrosive nature of the salt in the brine and the fact that the waste contains both a non-biodegradable salt and organic solids, make the disposal problem a particularly difficult one.

If, for example, the spent brine is discharged into a site from which it can enter into wells or streams used for irrigation, the quality of water from such source will be decreased, and in severe cases the water will actually cause deterioration of the soil to which it is applied so that it will no longer produce satisfactory crops. In addition to the effect on soil, sodium and chloride ions have been shown to exert a specific toxicity on certain plants. Almonds may develop tipburn and avocados, a leaf scorch, due to excessive sodium. Among the crops that are sensitive to chloride ion are peaches and other stone fruits, pecans, some citrus varieties, avocados, and some grapes. In addition, organic acids, such as lactic acid, which are present in these spent brines, are detrimental to the soil because they lower the pH of the soil considerably. In general, neutral soil, that is pH 7, is necessary for good crops.

Because of the present emphasis by federal, State, and local governments on pollution control, processors who rely on the procedure in question are facing a crisis—they must devise a disposal system which not only meets anti-pollution standards, but also does the job economically. A failure to meet these criteria means that the operations must be shut down.

A primary object of the invention is the provision of a novel process which obviates the problems outlined above. More particularly, the invention provides a procedure whereby the disposal problem is eliminated. The spent brine, instead of being discarded, is reconditioned to provide fresh brine for treating additional quantities of olives or other commodities.

Basically, the procedure of the invention involves a series of steps: Concentration of the spent brine using submerged combustion, incineration of the concentrate, dissolution of the residue in water, and filtration of the resulting solution to give a regenerated brine ready for use.

The practice of the invention is now described in detail, having reference to the annexed drawing. Numeral 1 designates a concentrator wherein the spent brine is evaporated by submerged combustion. The spent brine enters concentrator 1 by pipe 2; the concentrated brine leaves via pipe 3 equipped with valve 4.

To yield the desired concentration by submerged combustion, fuel gas and air are combined in mixer 5 and directed to burner 6 where combustion takes place. The hot gases flow into concentrator 1 via pipe 7 and bubble up through the brine contained therein. The resulting direct contact of the brine with the hot gases results in efficient evaporation without causing any significant scaling effect. It may be noted that the spent brine because of its acid pH, its content of salt, and its content of proteinous materials cannot be effectively concentrated by conventional procedures—those involving contact with a hot metallic surface such as steam coils or jackets. If such procedure is attempted, the surfaces become corroded and fouled with hard scaly deposits so that heat transfer is impeded and the equipment impaired.

Another advantage of our method of concentration is that the evaporation of water is achieved at a temperature below the normal boiling point of the brine. This situation is explained as follows: As the hot products of combustion flow through the brine, heat is transferred from the rising gas bubbles to the liquid through the bubble interface. The partial pressure of the water vapor in the rising bubble is less than the atmosphere so that boiling takes place at a temperature considerably below 212° F. For a saturated NaCl solution, the observed boiling point is about 200° F. (in contrast to a normal boiling point of 227.6° F.), corresponding to a depressed vapor pressure of about 443 mm. Hg., and a heat of evaporation of approximately 978 BTU/lb.

In general, the concentration is continued until there is produced a slurry having a solids content of about 50–60 percent. At this stage much of the salt will be in the form of crystals suspended in the thickened liquid. The slurry, however, retains its liquidity so that it can be readily removed from concentrator 1 and piped to subsequent operations.

The vapors produced during the concentration may be vented to the atmosphere. Usually, however, these vapors have a very disagreeable odor—due to the presence of lactic acid and other volatile organic substances—and it is preferred to scrub the vapors before discharging them. To this end, the vapors are directed by conduit 8 to scrubber 9 where they are contacted with water entering the scrubber via pipe 10. Water containing absorbed volatiles leaves the system via drain 11, while residual vapors are released through vent 12.

The concentrate—a slurry containing salt crystals in suspension—which is formed in concentrator 1 is directed by pipe 3 to incinerator 13. Therein, the concentrate is heated at a temperature of about 1,000°–1,400° F. in the presence of air, whereby organic components are burned or at least carbonized. In conducting the incineration, it is preferred that the temperature be maintained below 1,472° F. (the melting point of NaCl) to avoid fusing the salt. Incinerator 13 may take various forms. One may use, for example, a rotary kiln which is heated externally, or one which is heated internally by the combustion of natural gas or other gaseous or liquid fuel.

The product of the incinerator is largely (about 95 percent) salt with a small amount of impurities. It can be stored in that form for future use.

When fresh brine is needed, the appropriate amount of the crude salt (the product of the incineration) is dropped into tank 14 where it is dissolved in water. Since the crude salt contains some alkaline impurities, it is usually necessary to neutralize the solution (bring it to pH 7) by adding a small proportion of an acid such as hydrochloric. Impurities which remain undissolved may be drained out of the bottom of tank 14 through pipe 17 equipped with valve 18. Any remaining insoluble material is then removed from the brine by filtration. For this purpose, it is convenient to use the uniflow filter disclosed in U.S. Pat. No. 3,523,077, which apparatus is diagrammatically shown in the figure. The brine is directed by pipe 15 into filter chamber 19—a length of foraminous hose suspended vertically. The clear brine passes through the interstices of the hose and flows down the outside thereof into receptable 20 an out of the system via pipe 21. The insoluble material remains as a thickened sludge within chamber 19 and is removed from time to time by opening valve 22.

Hereinabove, it has been explained that after the product of the incineration is dissolved in water, the resulting solution is neutralized and filtered. Although this treatment is generally employed, alternative procedures are suitable. For example, the solution may be neutralized after filtration. Also, instead of applying filtration, the solution may be clarified simply by allowing it to stand in a tank or other vessel whereby the undissolved material will settle out. The neutralization may be applied before or after settling. Another plan is to use the neutralized solution directly—i.e., without any filtration or equivalent step—for the treatment of fresh batches of olives. The small content of undissolved material does not interfere with the processing of the fruit.

EXAMPLE

The invention is further demonstrated by the following illustrative example:

Fifty gallons of spent olive-processing brine was concentrated, using the system described above. During this concentration, the temperature of the liquid rose to 200° F. The resultant brown slurry was incinerated at 1,200° F. for 5 minutes. The gray solid residue from the incineration was dissolved in water and filtered, forming as an end product about 100 gallons of clear brine containing 4% NaCl and which after neutralization was suitable for re-use in olive processing. The chemical analyses of the brine, concentrate, incinerated residue, and reconditioned brine are given below.

|  | Feed brine | Concentrate | Incinerated residue | Reconditioned brine* |
|---|---|---|---|---|
| Specific gravity | 1.062 |  |  | 1.026 |
| pH | 3.7 | 4.1 |  | 10.0 |
| Solids, per cent | 9.6 | 57.5 | 100 | 4.0 |
| NaCl, per cent, dry basis | 84.1 | 91.3 | 96.5 | 98.7 |
| K, do. | 4.0 | 1.3 | 2.7 | 0.9 |
| Ca, do. | 0.1 | 0.1 | 0.1 |  |
| Sulphates, do. | 0.5 | 0.6 | 0.7 | 0.4 |
| Protein**, do. | 2.25 |  |  | <0.06 |
| C.O.D.***, ppm. | 34,700 |  |  | 25 |

\* pH not adjusted
\*\* Nitrogen content (%, dry basis) × 6.38
\*\*\* Chemical oxygen demand

Having thus described our invention, we claim:

1. A process for reconditioning a spent olive-processing brine which contains salt, organic acids including lactic acid, pigments, and proteinous substances, which comprises
   a. concentrating the spent olive-processing brine by submerged combustion evaporation wherein hot gaseous products of combustion directly contact and flow through said brine whereby to cause boiling thereof at a temperature below the normal boiling point of the brine, and whereby to effectuate the concentration with a minimum of scaling and corrosive effect,
   b. continuing said concentration while the temperature of the brine is raised to about 200° F. and there is produced a slurry of salt crystals suspended in liquid, which slurry has a solids content of about 60 percent,
   c. incinerating the slurry at a temperature of about 1,200° F. to burn or at least carbonize organic components,
   d. dissolving the incinerated residue in water,
   e. filtering the resulting solution to remove water-insoluble impurities, and
   f. neutralizing the filtered solution with hydrochloric acid to yield a regenerated brine which is suitable for use in the processing of olives.

2. The process of claim 1 wherein steps e and f are applied in reverse sequence.

* * * * *